United States Patent
Schneider

(10) Patent No.: US 6,623,035 B1
(45) Date of Patent: Sep. 23, 2003

(54) LANDING GEAR

(75) Inventor: Robert H. Schneider, Beaver Dam, WI (US)

(73) Assignee: Actuant Corporation, Glendale, WI (US)

(*) Notice: Subject to any disclaimer, the term of this patent is extended or adjusted under 35 U.S.C. 154(b) by 0 days.

(21) Appl. No.: 09/305,621

(22) Filed: May 5, 1999

(51) Int. Cl.⁷ .................................................. B60S 9/02
(52) U.S. Cl. ............................ 280/766.1; 280/763.1; 280/475; 254/419; 248/161
(58) Field of Search ........................... 280/475, 763.1, 280/766.1, 6.12, 507, 514, 515; 248/159, 161, 405, 407; 254/98, 419, 92

(56) References Cited

U.S. PATENT DOCUMENTS

| | | | |
|---|---|---|---|
| 2,065,952 A | * 12/1936 | Trautmann | 254/98 |
| 2,167,520 A | 7/1939 | Claud-Mantle | 280/33.15 |
| 2,413,761 A | * 1/1947 | Groover | 280/763.1 |
| 2,617,620 A | * 11/1952 | Jessop | 254/98 |
| 2,674,438 A | * 4/1954 | Dalton | 254/419 |
| 2,836,432 A | * 5/1958 | Delp et al. | 280/763.1 |
| 3,020,063 A | * 2/1962 | Warren, Jr. | 280/763.1 |
| 3,022,043 A | 2/1962 | Weiss | 254/98 |
| 3,281,160 A | * 10/1966 | Vinther et al. | 280/475 |
| 3,595,527 A | 7/1971 | Douglass | 254/86 |
| 3,783,960 A | * 1/1974 | Feliz | 280/475 |
| 3,921,958 A | 11/1975 | Brockelsby et al. | 254/86 |
| 4,106,328 A | * 8/1978 | Neeff | 280/763.1 |
| 4,307,896 A | 12/1981 | Walther et al. | 280/766 |
| 4,581,863 A | * 4/1986 | Thaler | 248/405 |
| 4,730,468 A | 3/1988 | Becker | 70/34 |
| 4,842,252 A | 6/1989 | McMahan | 254/420 |
| 4,863,184 A | 9/1989 | Mena | 280/475 |
| 5,067,746 A | * 11/1991 | Baker | 280/475 |
| 5,273,256 A | 12/1993 | Chambers | 254/45 |
| 5,421,555 A | 6/1995 | Sims | 254/420 |
| 5,509,687 A | * 4/1996 | Thorndike | 280/763.1 |
| 5,575,493 A | * 11/1996 | Schwartz et al. | 280/475 |

* cited by examiner

Primary Examiner—Brian L. Johnson
Assistant Examiner—Hau Phan
(74) Attorney, Agent, or Firm—Quarles & Brady LLP

(57) ABSTRACT

A landing gear leg adapted for mounting to a vehicle has an outer member, and a middle member telescoped slidably into the outer member. The middle member has a first end and a second end. The first end extends beyond the outer member. An inner member telescoped slidably into the middle member has a first end positioned within the outer member and a second end extending beyond the outer member. A locking mechanism locks the middle member in a fixed relationship with the inner member, and a drive mechanism slidably drives the inner member in relationship with the outer member from a retracted position to an extended position. A rack and pinion drive may be used to slidably move the leg between an extended and retracted position providing a simplified drive mechanism.

11 Claims, 4 Drawing Sheets

LANDING GEAR

FIELD OF THE INVENTION

This invention relates to landing gear for trailers and the like, more particularly, a landing gear assembly having a quick to ground feature and increased structural stability.

DESCRIPTION OF THE BACKGROUND ART

Vehicles, such as a recreational vehicle or semi-trailer, incorporate jacks to support, level, or raise the vehicle. Semi-truck trailers utilize jacks as landing gear legs in a landing gear assembly to raise and support the front of the trailer when disengaged from a semi-truck tractor.

In particular, a typical semi-truck tractor and trailer are attached utilizing a "fifth wheel" type connection. A fifth wheel connection has a lubricated flat swivel plate and catch assembly mounted on the semi-truck tractor to engage a corresponding lubricated flat swivel plate and downwardly protruding "king pin" mounted on the underside of the forward portion of the trailer. The trailer king pin is received in a slot in the tractor swivel plate where it engages the tractor catch assembly locking the tractor and trailer together.

In order to disengage the tractor from the trailer, landing gear legs mounted on a forward section of the trailer are extended to the ground raising the king pin upwardly disengaging it from the catch assembly. Upon disengagement, the tractor pulls away from the trailer which is now supported by trailer rear wheels and the landing gear.

Typical landing gear, such as disclosed in U.S. Pat. No. 4,307,896, are formed with intermitting box-section supporting legs. In U.S. Pat. No. 4,307,896, the interfitting box-sections have a ground engaging leg telescopically interfitted with a box-like fixed leg which is mounted to the trailer. The ground engaging leg telescopes between a retracted position and an extended position. Typically the ground engaging leg is manually or electrically driven in the telescoping direction. Landing gear having a single telescoping section, however, is time consuming to extend and retract because the single telescoping section must be driven the entire distance of extension or retraction.

In order to reduce the time required to extend or retract the landing gear legs, a three piece telescoping leg was developed with a quick to ground feature. In the three piece leg with a quick to ground feature, the leg has an outer member, a middle member telescoping from the outer member, and an inner member telescoping from the middle member. The inner member telescopes freely from the middle member to engage the ground and is then locked into a fixed relationship with the middle member. The middle member is then manually or electrically driven to raise the semi trailer. This configuration deploys the inner member having the smallest cross section, and therefore the least structural stability, to engage the ground and support the trailer.

SUMMARY OF THE INVENTION

The present invention provides a landing gear leg adapted for mounting to a vehicle having an outer member, and a middle member telescoped slidably into the outer member. The middle member has a first end and a second end. The first end extends beyond the outer member. An inner member telescoped slidably into the middle member has a first end positioned within the outer member and a second end extending beyond the outer member. A locking mechanism locks the middle member in a fixed relationship with the inner member, and a drive mechanism slidably drives the inner member in relationship with the outer member from a retracted position to an extended position.

A general objective of the present invention is to provide a quick to ground landing gear with improved structural stability. This objective is accomplished by providing a middle member slidably telescoping from an outer member and an inner member slidably telescoping from the middle member, wherein the middle member telescopes from said outer member for engaging the ground and is locked in a fixed relationship with the inner member which is driven by a drive mechanism for further extension of the leg.

Another objective of the present invention is to provide a landing gear assembly with improved structural stability. This objective is accomplished by providing a pair of landing gear legs having improved structural stability in which leg inner members are substantially simultaneously driven for further extension of the leg.

Still another objective of the present invention is to provide a method of extending a landing gear leg with improved structural stability. This is accomplished by telescoping a landing gear leg middle member slidably inserted inside a landing gear leg outer member from a retracted position to an extended position; fixing the landing gear leg middle member in relationship with a landing gear leg inner member slidably inserted inside the landing gear leg middle member; and driving the landing gear leg inner member from a retracted position to an extended position.

Yet another objective of the present invention is to provide a landing gear leg with a simple drive mechanism. This is accomplished by providing a rack and pinion drive mechanism.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
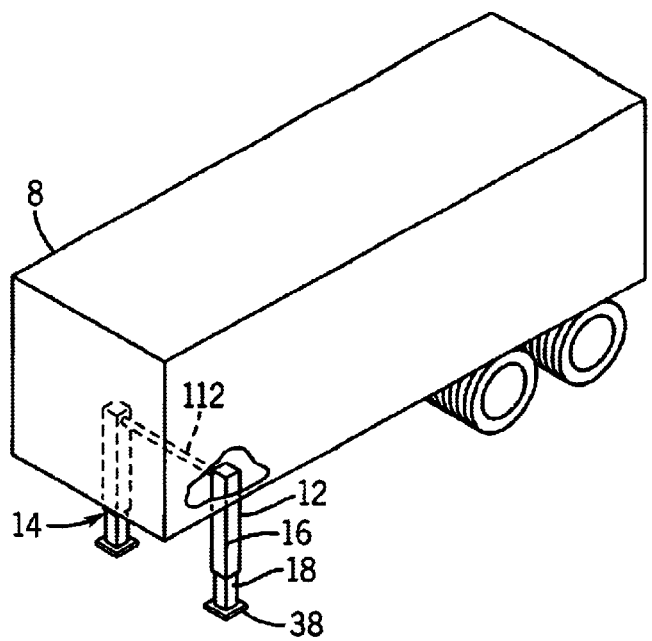
FIG. 1 is a perspective view of a vehicle incorporating the present invention.
Figure 2:
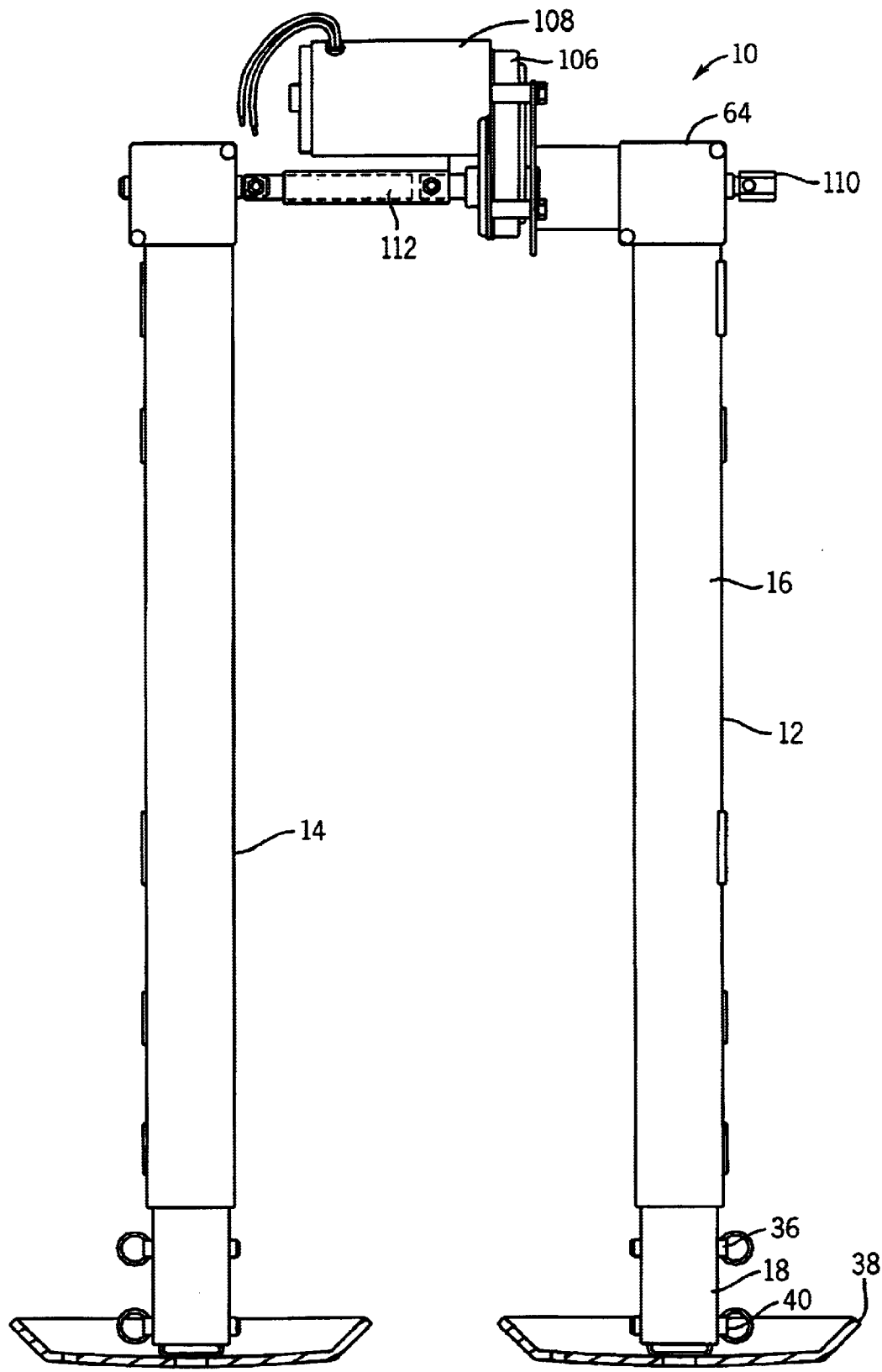
FIG. 2 is a front plan view of a the landing gear assembly incorporating the invention.
Figure 3:
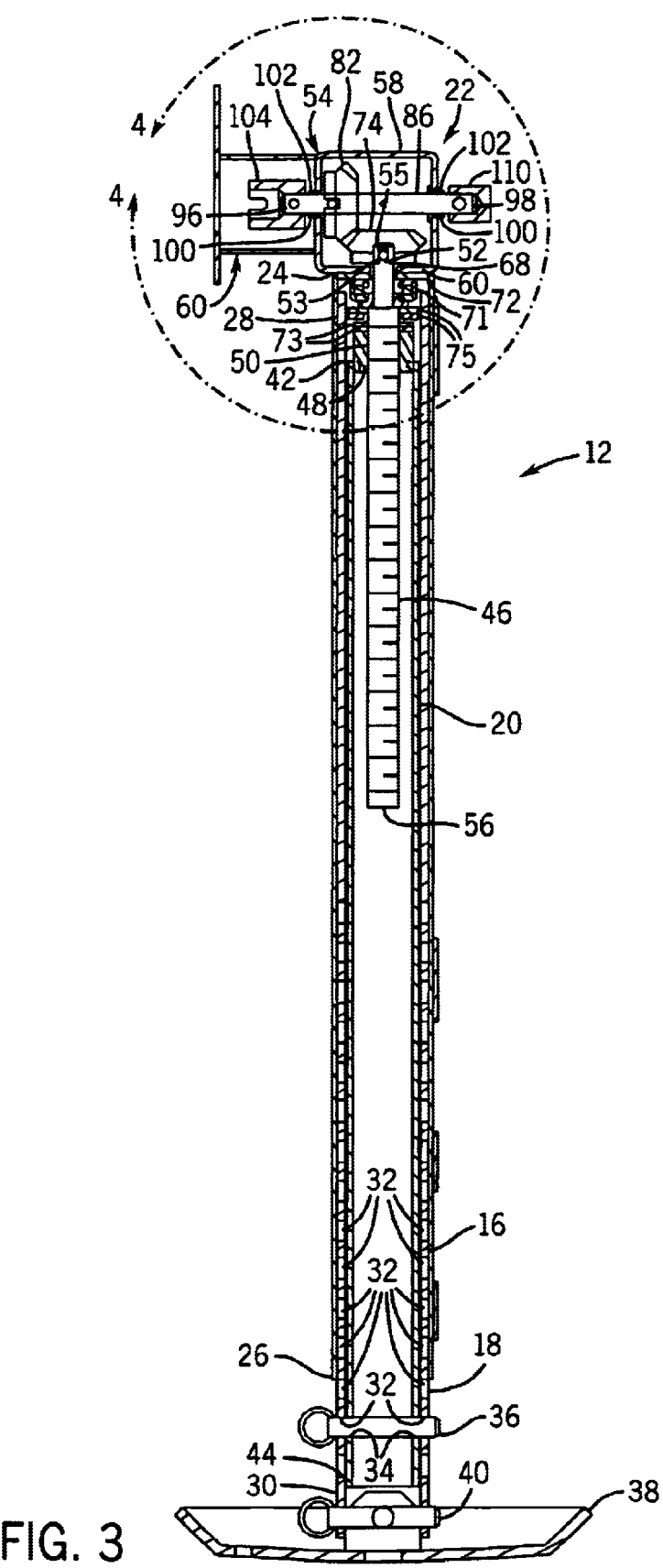
FIG. 3 is a front cross sectional view of a landing gear leg of FIG. 2.

Referring to FIGS. 1–3, a vehicle 8, such as a recreational vehicle, trailer, or the like, has a landing gear assembly 10 comprising two extendible legs 12, 14. Each leg 12, 14 has an outer member 16, a telescoping middle member 18 which is slidably moveable between a retracted and an extended position, and a telescoping inner member 20 which is forcibly slidably driven by a drive mechanism 22 between a retracted and an extended position.

Referring to FIG. 3, the tube shaped outer member 16 has a first end 24 rigidly mounted to the drive mechanism 22 and an open second end 26. The drive mechanism 22 is mounted to the outer member first end 24, using methods known in the art, such as welding, or the like. Preferably, the outer member 16 is a square tube, formed from steel or other suitable material having similar strength characteristics. Although a square tube is described herein, any shaped tube may be used without departing from the scope of the present invention.

The middle member 18 has a shape corresponding to the outer member 16 with a first end 28 disposed inside the outer member 16 and a second end extending out of the outer member second end 26. The outer dimensions of the middle member 18 are proportioned so as to form a close sliding fit within the inside dimensions of the outer member 16. By providing the middle member 18 with a shape corresponding to the outer member 16, the members 16, 18 provide structural support to each other. Advantageously, the slidably telescoping middle member 18 provides a quick to ground deployment from a retracted position to an extended position by dropping the middle member 18 toward a supporting surface (not shown), such as the ground.

Pairs of opposing holes 32 are formed in the middle member 18 and spaced axially along the middle member second end 30. One of the pair of holes 32 are aligned with corresponding holes 34 formed in the inner member 20 to define the retracted or extended position of the middle member 18. The aligned holes 30, 32 receive a pin 36 fixing the relationship between the middle and inner members 18, 20 in either the middle member 18 retracted or extended position.

A foot 38 mounted to the middle member second end 30 engages the supporting surface. The foot 38 provides a large surface area for engagement with the supporting surface to prevent the landing gear leg 12 from sinking or forming a depression in the surface. Preferably, the foot 38 is pivotally mounted to the middle member 18 by a pin 40 inserted through the lowermost pair of opposing holes 32 in the middle member 18. Advantageously, by pivotally mounting the foot 38 to the middle member 18, the foot 18 pivots to accommodate an uneven ground or other non-level supporting surface.

The inner member 20 has a shape corresponding to the middle member 18 with a first end 42 disposed inside the outer member 16 and a second end 44 extending out of the outer member 16. The inner member 20 is in a slidable relationship with the middle member 18 allowing the middle member 18 to move from the retracted and the extended positions. The outer dimensions of the inner member 20 are proportioned so as to form a close sliding fit within the inside dimensions of the middle member 18. As in the middle member 18, by providing the inner member 20 with a shape corresponding to the middle member 18, the members 18, 20 provide structural support to each other.

A pair of opposing holes 34 are formed in the inner member lower end 44. The pair of holes 34 are aligned with corresponding holes 32 formed in the middle member 18 and receive a pin 36 to lock the middle member 18 in the retracted or extended position.

Figure 4:
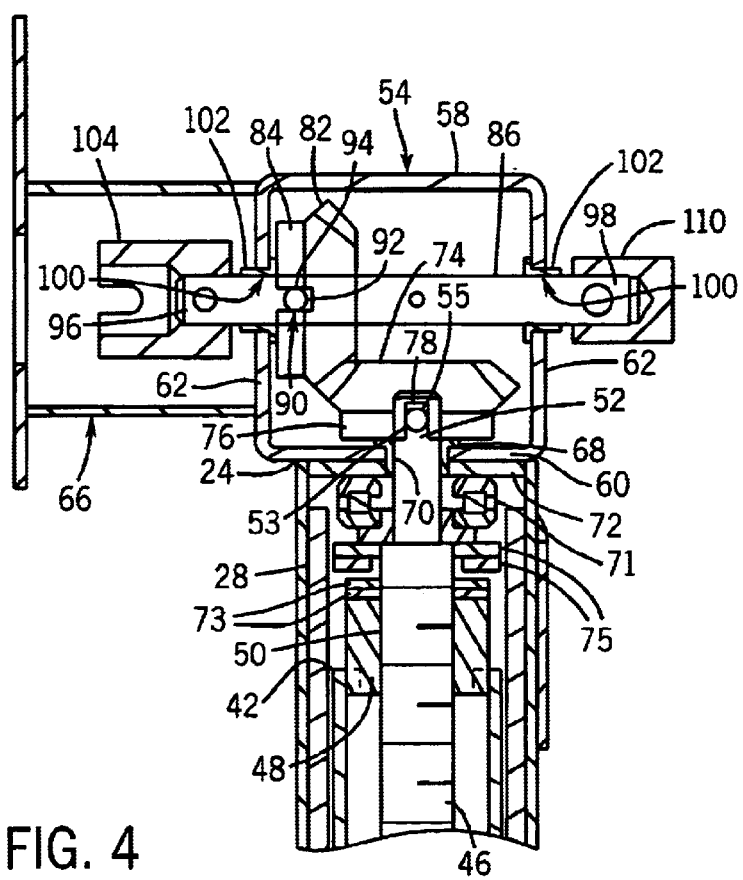
FIG. 4 is a detail view along of area 4—4 of FIG. 3.

Looking particularly at FIG. 4, the drive mechanism 22 is mounted to the inner member first end 24 and drives the inner member 20 between a retracted position and an extended position. The vehicle 8 is raised by fixing the middle member 18 in relationship with the inner member 20 and then driving the inner member 20 with the drive mechanism 22 to further extend the inner and middle members 18, 20 downwardly toward the supporting surface. Advantageously, by driving the inner member 20, as opposed to the middle member 18, such as in the prior art, the inner member 20 structurally supports the middle member 18, which also has a larger cross section, providing a structurally stronger landing gear leg 12.

In a first embodiment, the drive mechanism 22 is a screw jack having an acme thread screw 46 threadably inserted in a block 48 having a threaded bore 50. The block 48 is rigidly mounted to the inner member first end 42, using methods known in the art, such as welding. The screw 46 has a first end 52 extending into a power transmission housing 54 and a second end 56 extending through the block 48 into the inner member 20. The screw first end 52 has a hole 53 for receiving a pin 55 to restrict a first miter gear 74 mounted on the screw first end 52 in the housing 54 from rotating freely.

The substantially cube-shaped power transmission housing 54 has a top 58, a bottom 60 and four sides 62 and is mounted to the vehicle 8 using methods known in the art, such as welding, bolting, or the like. An access plate 64 (shown in FIG. 2) mounted to one of the transmission housing sides 62 by screws, or other methods known in the art, provides access to the housing interior. A bracket 66 joined to the transmission housing 54 using methods known in the art, such as welding, bolting, or the like, mounts the housing 54 to the vehicle 8.

The transmission housing bottom 60 is mounted to the outer member first end 24 and has an aperture 68 with a bushing 70 mounted therein. The screw first end 52 extends through the aperture 68 and is radially supported by the bushing 70. The screw first end 52 also extends through a thrust bearing 71 and spacer plate 72 assembly mounted to the transmission housing bottom 60 which transfers the axial and radial forces exerted by screw 46 to the transmission housing 58, which in turn transmits the forces to the vehicle 8 through the bracket 66. Additional washers 73 and spacer plates 75 interposed between the threaded block 48 and thrust bearing 71 maintain the separation between the thrust bearing 71 and block 48 while transfer axial forces.

A first miter gear 74 disposed in the transmission housing 54 has a collar 76 which fits over the screw first end 52. A pair of opposing slots 78 formed in the collar 76 are aligned with the hole 53 in the screw first end 52. A pin 55 inserted through the slots 78 and hole 53 restricts free rotation of the first miter gear 74 on the screw first end 52.

A second miter gear 82 having a collar 84 is disposed in the housing 54 and engages the first miter gear 74 at a substantially right angle. A drive shaft 86 extends through an axial bore 88 in the second miter gear 82 and has a hole 90 formed therein. Opposing slots 92 formed in the second miter gear 82 align with the drive shaft hole 90. A pin 94 inserted into the aligned slots 92 and hole 90 restricts the second miter gear 82 from rotating freely on the drive shaft 86. The drive shaft 86 rotatably drives the second miter gear 82 which rotatably drives the first miter gear 74.

The drive shaft 86 has a first end 96 and a second end 98, each end 96, 98 extending through openings 100 in opposing sides 62 of the transmission housing 54. The shaft ends 96, 98 are supported by bushings 102 mounted in the openings 100. A coupling 104 on the drive shaft first end 96 engages a gear reduction assembly 106 driven by an electrical motor 108 to rotatably drive the shaft 86. The second drive shaft end 98 has a coupling 110 adapted for receiving a manual override apparatus, such as a handle, for driving the shaft 86 in event of motor failure. Rotation of the drive shaft 86 rotates the miter gears 74, 82 and screw 46. Rotating the screw 46 drives the block 48 in an axial direction. By rotating the screw 46 in a clockwise or counterclockwise direction, the inner member 20 is slidably moved between the retracted or extended positions. Advantageously, the screw jack inherently locks the screw 46 in a fixed position preventing inadvertent retraction or extension of the leg 12 without being driven by the drive shaft 86.

The gear reduction assembly 106 (shown in FIG. 2) is coupled to a second drive shaft 112 which drives the other substantially identical landing gear leg 14 mounted to the vehicle 8. Advantageously, the manual override apparatus drives the first and second landing gear legs 12, 14 in the event of motor failure.

Figure 6:
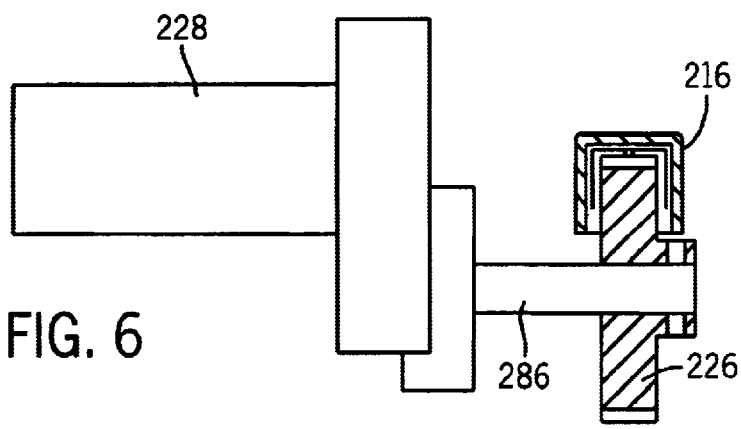
FIG. 6 is a top view of the extendible leg of FIG. 5.
Figure 5:
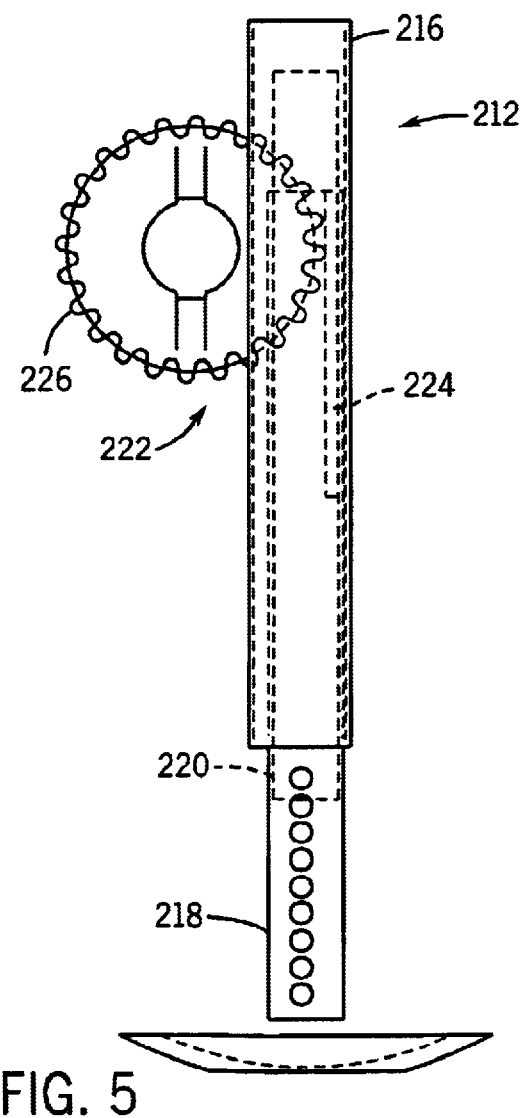
FIG. 5 is a side view of an extendible leg rack and pinion drive mechanism.

In a second embodiment shown in FIGS. 5 and 6, An extendible leg 212 has an outer member 216, a telescoping middle member 218 which is slidably moveable between a retracted and an extended position, and a telescoping inner member 220 which is forcibly slidably driven by a drive mechanism 222 between a retracted and an extended position. The drive mechanism 222 has a rack 224 mounted to the inner member 220 and pinion 226 engaging the rack 224. The pinion 226 is rotatably driven by a drive shaft 286, which is driven by a motor 228 with a brake (not shown). Although mounting the rack to the middle member is described herein, the rack and pinion drive may also be used in a conventional landing gear leg having only a fixed outer member and a single slidably telescoping member, wherein the rack is mounted to the telescoping member. The rack may also be incorporated in a conventional quick to ground landing gear leg, having an outer member, a telescoping middle member, an a telescoping inner member, wherein the rack is mounted to the telescoping inner member.

Advantageously, the rack and pinion drive eliminates the miter gears in the transmission housing of the first embodiment. However, a locking mechanism, such as a motor brake or pinion ratchet is necessary to prevent the rack and pinion mechanism from inadvertently allowing the leg to extend or retract due to the weight of the trailer when the leg is supporting the trailer, or due to gravity when the leg is in the retracted position.

While there has been shown and described what are at present considered the preferred embodiment of the invention, it will be obvious to those skilled in the art that various changes and modifications can be made therein without departing from the scope of the invention.

I claim:

1. A landing gear leg adapted for mounting to a vehicle, said leg comprising:
   an outer member;
   a middle member axially telescoped slidably into said outer member; said middle member having a first end extending beyond said outer member;
   an inner member axially telescoped slidably into said middle member, said inner member having a first end positioned within said outer member;
   a locking mechanism which locks said middle member in an axially fixed relationship with said inner member as said inner member moves between a retracted position and an extended position, said locking mechanism is one or more pins inserted into aligned holes formed in said middle member and said inner member; and
   a drive mechanism acting on said inner member first end for slidably driving said inner member in relationship with said outer member between the retracted position and the extended position.

2. The landing gear leg as in claim 1, wherein said drive mechanism is a screw jack.

3. The landing gear leg as in claim 1, wherein said drive mechanism is a rack and pinion.

4. The landing gear leg as in claim 1, wherein said drive mechanism is adapted for manual actuation.

5. The landing gear leg as in claim 1, wherein said middle member is proportioned so as to form a close sliding fit with said outer member.

6. The landing gear leg as in claim 1, wherein said inner member is proportioned so as to form a close sliding fit with said middle member.

7. The landing gear leg as in claim 1, further comprising a foot mounted to said middle tube.

8. The landing gear leg as in claim 1, wherein said middle member has a second end positioned within said outer member.

9. A landing gear assembly comprising:
   a first landing gear leg having an outer member, a middle member axially telescoped slidably into said outer member, said middle member having a first end extending beyond said outer member, an inner member axially telescoped slidably into said middle member, said inner member having a first end positioned within said outer member, and a locking mechanism which locks said middle member in an axially fixed relationship with said inner member as said inner member moves between a retracted position and an extended position, said locking mechanism is one or more pins inserted into aligned holes formed in said middle member and said inner member;
   a second landing gear leg having an outer member, a middle member axially telescoped slidably into said outer member, said middle member having a first end extending beyond said outer member, an inner member axially telescoped slidably into said middle member, said inner member having a first end positioned within said outer member, and a locking mechanism which locks said middle member in an axially fixed relationship with said inner member as said inner member moves between a retracted position and an extended position, said locking mechanism is one or more pins inserted into aligned holes formed in said middle member and said inner member; and
   a drive mechanism acting on said first landing gear leg inner member first end and said second landing gear leg inner member first end for substantially simultaneously driving said first and second landing gear leg inner members between the retracted and extended positions.

10. The landing gear leg as in claim 9, wherein at least one of said landing gear middle members has a second end positioned within said landing gear outer member.

11. A vehicle comprising:
   one or more legs, each of said legs having an outer member;
   a middle member telescoped axially slidably into said outer member; said middle member having a first end extending beyond said outer member;
   an inner member telescoped axially slidably into said middle member, said inner member having a first end positioned within said outer member;
   a locking mechanism which locks said middle member in an axially fixed relationship with said inner member as said inner member moves between a retracted position and an extended position, said locking mechanism is one or more pins inserted into aligned holes formed in said middle member and said inner member; and
   a drive mechanism acting on said inner member first end for slidably driving said inner member in relationship with said outer member between the retracted position and the extended position.

* * * * *

UNITED STATES PATENT AND TRADEMARK OFFICE
CERTIFICATE OF CORRECTION

PATENT NO. : 6,623,035 B1
DATED : September 23, 2003
INVENTOR(S) : Robert H. Schneider It is certified that error appears in the above-identified patent and that said Letters Patent is hereby corrected as shown below:

Column 1,
Line 34, "intermitting" should be -- interfitting --

Signed and Sealed this

Ninth Day of March, 2004

JON W. DUDAS
*Acting Director of the United States Patent and Trademark Office*